United States Patent [19]

Beauch

[11] Patent Number: 4,543,848
[45] Date of Patent: Oct. 1, 1985

[54] TILT STEERING COLUMN FOR VEHICLES

[75] Inventor: Howard D. Beauch, Frankenmuth, Mich.

[73] Assignee: General Motors Corporation, Detroit, Mich.

[21] Appl. No.: 564,580

[22] Filed: Dec. 23, 1983

[51] Int. Cl.[4] .......................... B62D 1/18; B60R 25/02
[52] U.S. Cl. .................................. 74/493; 74/484 R; 74/541; 280/775; 200/61.54
[58] Field of Search ............... 74/493, 484 R, 541; 280/775; 200/61.54

[56] References Cited

U.S. PATENT DOCUMENTS

| | | | |
|---|---|---|---|
| 3,167,971 | 2/1965 | Zeigler et al. | 74/493 |
| 3,267,766 | 8/1966 | Glover et al. | 280/775 |
| 3,665,130 | 5/1972 | Suzuki | 200/61.54 |
| 4,016,380 | 4/1977 | Schawinsky et al. | 200/61.27 |
| 4,029,168 | 6/1977 | Kramer | 180/114 |
| 4,088,858 | 5/1978 | Kramer | 74/493 |
| 4,144,425 | 3/1979 | Mutschler et al. | 200/61.54 |
| 4,277,658 | 7/1981 | Delp et al. | 200/61.54 |

Primary Examiner—Henry C. Yuen
Attorney, Agent, or Firm—Charles R. White

[57] ABSTRACT

A steering column for vehicles incorporating an improved tiltable steering wheel head assembly having a separable switch housing that accommodates a wide range of plug-in control switches, the tilt head assembly is pivotally mounted in a one-piece stamped tilt head support which has a neck portion telescoped in and welded to the upper end of the mast jacket.

6 Claims, 6 Drawing Figures

TILT STEERING COLUMN FOR VEHICLES

This invention relates to vehicle steering columns and more particularly to a new and improved tilt column providing angular adjustment of the vehicle steering wheel Prior to the present invention, numerous tilt columns have been provided in vehicles to allow the operator to adjust the position of the steering wheel for optimizing driver comfort while driving the vehicle and to facilitate vehicle entry and exit while the vehicle is stationary. While these prior columns have met their objectives and are used in a wide range of vehicles, their complexity has grown along with the requirement for column mounted devices such as ignition switches, column locks, windshield wiper and turn signal switches usually housed within the tilt head of the column. Furthermore, the prior art tilt head supports are generally complex zinc die castings which are secured to tubular steel mast jackets by special threaded fasteners extending through openings provided in the castings and into aligned openings in the jacket.

In accordance with the present invention, there is a new and improved steering column which incorporates a new and improved tilt head support stamped from steel stock which preferably is welded to the upper end of the steel mast jackets of the steering column for optimizing the jointing of these parts. The new and improved stamped steel support is a lightweight unitized connector that provides for the pivoting of the tilt head assembly, good anchorage for the locking shoes and retention of the tilt head spring which biases the tilt head to selected positions. Importantly in this invention, the tilt head assembly incorporates a separable switch housing assembly that provides for the plug-in of selected switch modules for switches such as the turn signal and windshield wiper. Since the switch housing assembly adapts to a wide range of switch modules, various configurations can be produced to meet varying design requirements for different vehicles. The tilt column of this invention is easy to service and to repair or replace. With the new and improved tilt support, manufacture is facilitated since the part is readily stamped from sheet metal stock with a fixed design which does not require machining or other expensive finishing procedures.

These and other features, objects and advantages of this invention will become more apparent from the following detailed description and drawing in which.

Figure 1:
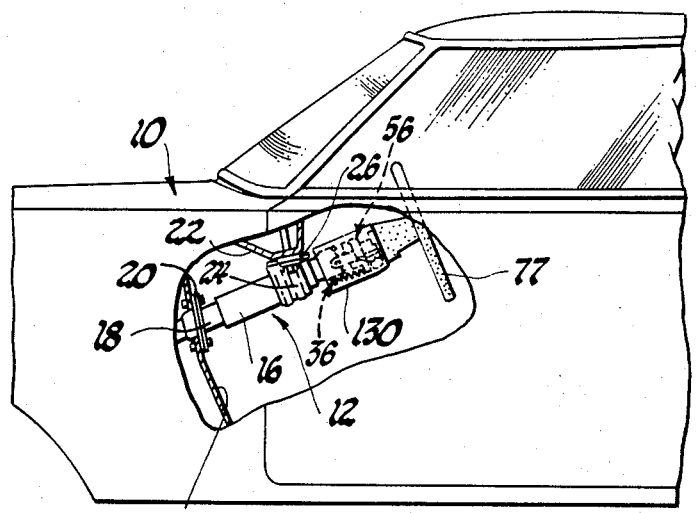
FIG. 1 is a side elevational view of a vehicle with portions broken away to illustrate a tiltable steering column in accordance with the present invention.

With reference to FIG. 1 of the drawing, there is shown a vehicle body 10 which has within its passenger compartment a steering column assembly 12 that extends therein through a forward bulkhead 14. More particularly the steering column assembly includes upper and lower tubular steel jackets 16 and 18 normally secured in the illustrated telescopic relationship. The lower jacket 18 is secured to bulkhead 14 by bracket 20. The upper jacket 16 is mounted to stationary support structure such as the instrument panel 22 by a bracket assembly 24 including conventional release capsules 26 such as that shown by U.S. Pat. No 3,394,613 for Steering Column Mounting Bracket Assembly issued July 30, 1968 to Curtindale and assigned to the assignee of this invention and herein incorporated by reference.

Operatively mounted between the lower and upper jackets 16 and 18 is a deforming ball unit 30 comprising a plastic sleeve 32 in which a plurality of hardened steel balls 34 are rotatably mounted. When these jackets are telescopically collapsed under predetermined load, the balls roll and deform the metal of the telescopically collapsing jackets to dissipate energy of the load.

Figure 2:
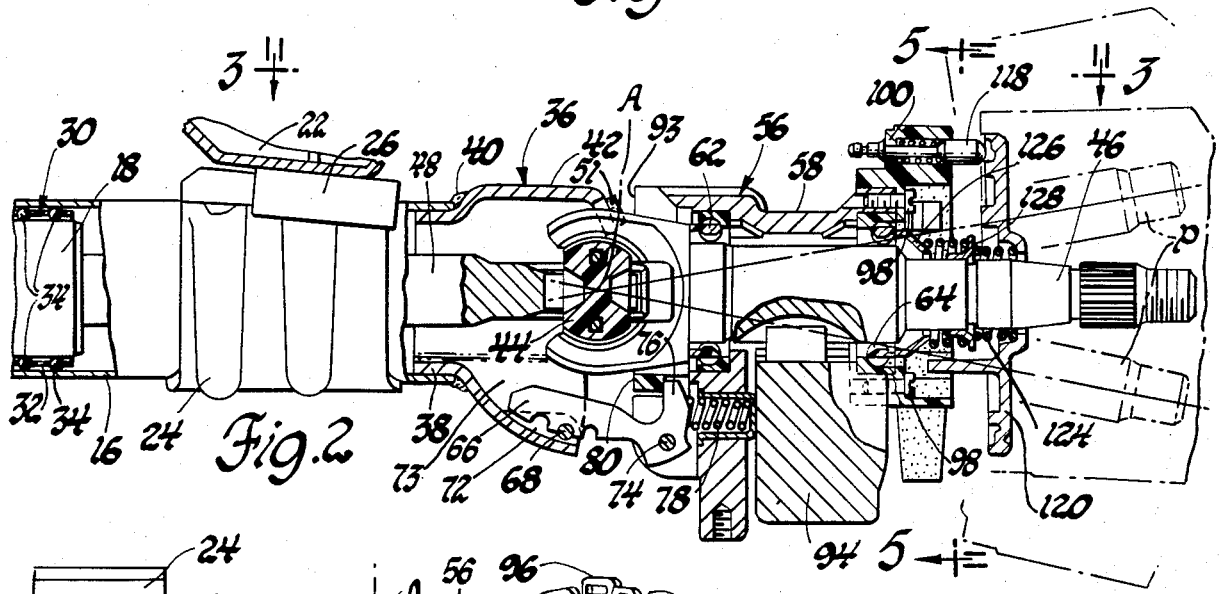
FIG. 2 is a side view with parts in cross-section of the tilt column of FIG. 1.
Figure 3:
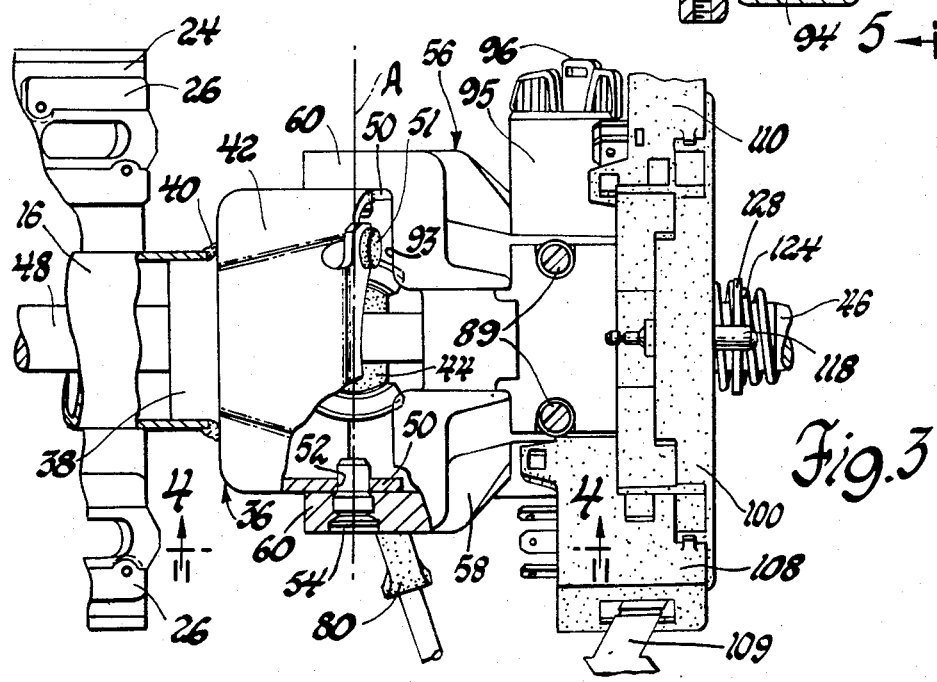
FIG. 3 is a top view taken along lines 3—3 of FIG. 2.
Figure 4:
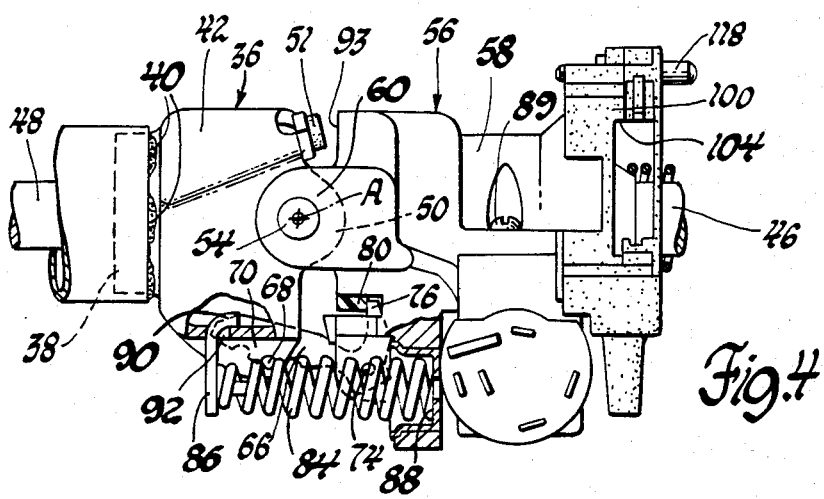
FIG. 4 is a side view of the tilt head assembly and tilt support taken along lines 4—4 of FIG. 3.
Figure 5:
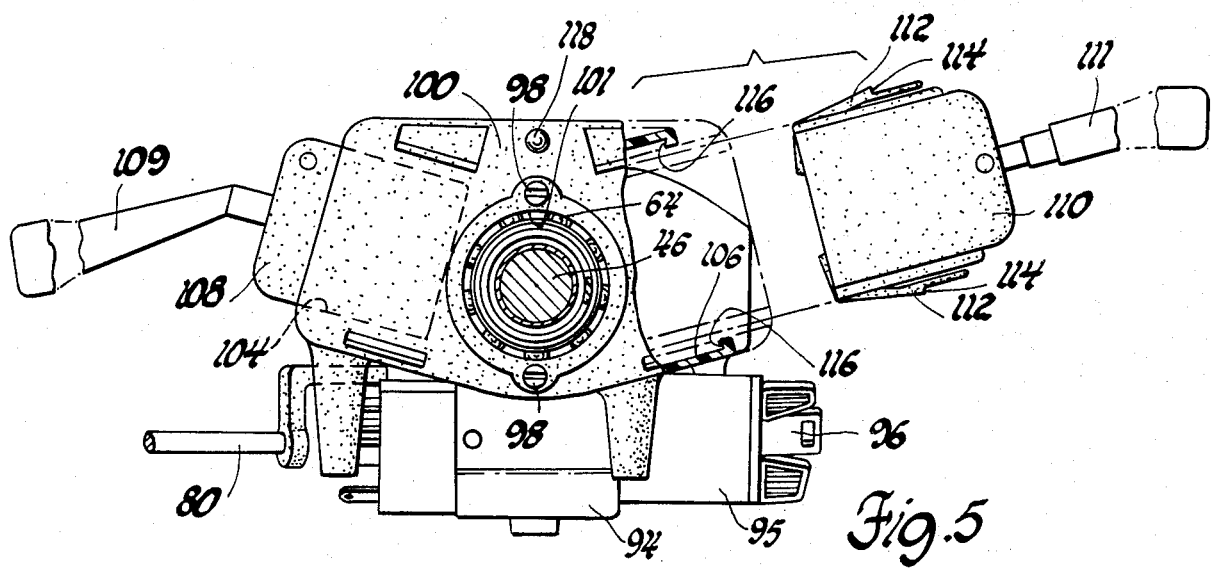
FIG. 5 is a view taken along lines 5—5 of FIG. 2.
Figure 6:
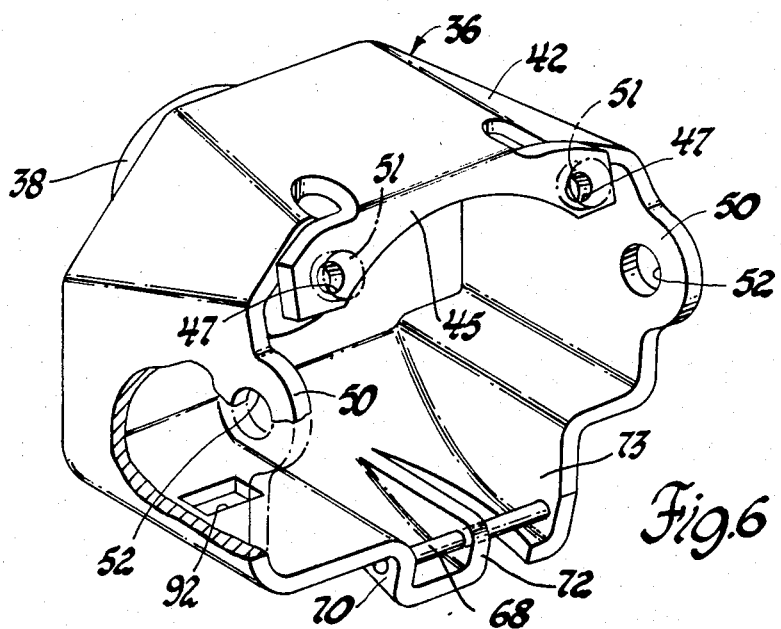
FIG. 6 is a perspective view of the tilt support.

Fixed in the upper end of the upper jacket 16 is a tilt head support 36 stamped from steel sheet stock into a one-piece, hollow part of substantially uniform thickness with a cylindrical neck 38 which closely fits within the upper end of the tubular jacket 16. Welds 40 rigidly secure the support 36 to the jacket 16. The tilt head support 36 has a shell-like main body 42 extending upwardly from the neck 38 to accommodate the universal joint 44 connecting the upper and lower cylindrical steering shafts 46, 48 of this steering column assembly. The steering shaft 48 extends through the mast jacket 18 into driving connection with a conventional intermediate shaft and coupling for actuating a steering gear for turning the dirigible wheels of vehicle 10. The main body 42 of support 36 terminates in a downwardly inclined stop plate 45 which has openings 47 at opposite ends thereof to receive elastomer bumpers 51. These bumpers provide the up stop for the tilt head assembly described below. Formed in the side walls of main body 42 of the tilt head support 36 are a pair of laterally spaced side ears 50 which have aligned openings 52 that receive laterally extending pivot pins 54 that pivotally mount a tilt head assembly 56 to the support 36 for turning movement with respect to horizontal axis A to selected tilt positions. The tilt head assembly 56 comprises a central body or housing assembly 58 cast from aluminum or other lightweight metal with projecting ears 60 which fit over the corresponding ears of the support 36 and carry the pivot pins 54. In the installed position, pivot pins 54 are in axial alignment with the pivot center of the universal joint 44. The housing assembly 58 has a cylindrical opening therein through which the upper steering shaft 46 extends. Ball bearing assemblies 62, 64 mounted internally in the housing assembly 58 support the upper steering shaft 46 for rotation therein. Conventional locking shoes, exemplified by locking shoe 66, are provided to releasably secure the tilt head assembly 56 in an adjusted tilt position. Various tilt positions are shown by phantom line positions P in FIG. 2. Locking shoe 66 has a free end with arcuately spaced notches on the lower side thereof that are selectively engageable with a locking pin 68, mounted between the walls 70, 72 and 73 formed in the stamped tilt head support 36 to set the angular or tilt position of the tilt head assembly. Each locking shoe is pivotally mounted on the steering column housing assembly by pivot pin 74 and has a crank arm 76 extending upwardly therefrom. A helical spring such as spring 78 supported in the steering column housing assembly 58 seats against the upper side of the crank arm to turn the associated locking shoe counterclockwise in FIG. 2 to yieldably hold the locking shoe in locking engagement with the pin 68. Actuator lever 80 extends from a pivot mounting, not shown, within the steering column housing assembly 58 to the exterior thereof while engaging the forward side of the crank arm 76. By manually turning the lever on the pivot toward the steering wheel 77 carried on the splined end of steering shaft 46, the force of the locking shoe spring is overcome and the locking shoe is turned clockwise to release from lock pin 68 so that the tilt head assembly 56 can be tilted to a new selected position. In preferred practice, two locking shoes are utilized in side-by-side relationship operated by a single lever. Spacing of the locking notches in the two shoes are different to increase the number of tilt locking positions.

The tilt head assembly 56 is biased upwardly by a helical tilt spring 84 having a lower end secured to a fixed spring guide 86. The other end of the spring extends into a spring retainer 88 mounted in steering column housing assembly 58. The spring guide 86 has a right-angled upper end 90 which fits through a lower slot 92 and seats against an inner surface of the tilt head support under the force of spring 84. The upward movement of the tilt head assembly is terminated by contact of the inner wall 93 of the steering column housing assembly with bumpers 51. With this construction, the tilt spring, the spring guide and retainer can be easily removed, serviced and replaced if necessary.

Secured to the underside of the steering column housing assembly 58 by shear bolts 89 is a locking cylinder 94 and an associated ignition switch assembly 95 operated by removable ignition key 96. The heads of these bolts may be torqued so that they shear from their shanks on installation to deter subsequent unauthorized removal of the ignition switch assembly.

Secured to the upper end of the steering column housing assembly 58 by threaded fasteners 98 is a generally rectangular switch housing assembly 100 of plastic material. This housing assembly has annular longitudinally extending opening 101 through which steering shaft 46 extends. The perimeter of the switch housing seats against the top of tilt housing 58. The switch housing assembly 100 has lateral or side openings 104 and 106 on opposite sides thereof which accommodate plug-in switch assemblies 108 and 110 respectively for turn signal control and for windshield wipers. Switch 108 is actuated by manual lever 109 while switch 110 is actuated by manual lever 111. The sides of these switches have integral arms 112 sprung outwardly which are provided with locking shoulders 114 for spring locking engagement with the side catches 116 formed in the switch housing when the switches are inserted into corresponding side opening in the switch housing assembly. Assuming the switches are installed, the free end of the arms 112 can be depressed so that the locking shoulders are cleared from the associated catches to permit easy withdrawal of the switches from the housing assembly. With this construction, switches can be easily removed for repair or replacement as necessary. Also, a wide variety of switch designs can be utilized to suit particular requirements of different vehicles employing this steering column.

The signal switch housing assembly 100 has a central axial opening through which spring biased horn contact plunger 118 extends. This contact plunger is actuated through a horn contact plate 120 mounted on steering shaft 46. Spring 124 seated on spring seat 128 yieldably hold the spring plate in the FIG. 2 position and ready for manual depression to close the horn circuitry. A suitable cylindrical cover 130 attaches to the steering column housing assembly to provide a finely finished appearance for the tilt head assembly.

While a preferred embodiment of this invention has been shown and described to illustrate the invention, other embodiments will become apparent to those skilled in the art. Accordingly, the scope of this invention is set forth in the following claims.

The embodiments of the invention in which an exclusive property or privilege is claimed are defined as follows:

1. A vehicle steering column comprising a tubular steel jacket assembly adapted to be operatively mounted in a vehicle, a fixed support secured to an upper end of said tubular jacket assembly, a tilt head assembly having a central body, a steering wheel mounted on said tilt head assembly, first pivot means mounting said tilt head assembly to said tilt head support for limited tilting movement with respect to a horizontal axis of rotation, an intermediate steering shaft extending axially through said jacket assembly, an upper steering shaft forming part of said tilt head assembly terminating in connection with said steering wheel, second pivot means operatively aligned with said first pivot means operatively connecting the intermediate steering shaft to the upper steering shaft so that said shafts can be turned together for vehicle steering and so that said upper shaft can be tilted with said tilt head assembly, bearing means mounting said upper steering shaft for rotation within said tilt head assembly, releasable locking means supported on said central body for releasably connecting said tilt head assembly at selected angular positions with respect to said fixed support, said fixed support comprising a hollow shell of substantially uniform thickness stamped from steel sheet stock having an enlarged cup-like main body supporting said first pivot means and further having a tubular neck, said neck being slip fitted with respect to the upper end of said jacket assembly and fastener means directly connecting said support to said jacket assembly, and a signal switch housing assembly secured to the central body of the tilt head assembly and forming the upper end thereof.

2. The steering column of claim 1 wherein said fastener means directly connecting said support to said jacket comprises weld means and wherein said signal switch housing assembly incorporates plug-in signal switches.

3. A vehicle steering column comprising a tubular steel jacket assembly adapted to be operatively mounted in a vehicle, a fixed support secured to an upper end of said tubular jacket assembly, a tilt head assembly, first pivot means pivotally securing said tilt head assembly to said fixed support for limited tilting movement with respect to a horizontal axis of rotation, an intermediate steering shaft extending axially through said jacket assembly, an upper steering shaft forming a central component of said tilt head assembly, second pivot means aligned with said first pivot means connecting the intermediate steering shaft to the upper steering shaft for steering and for limited tilting movement with respect to said horizontal axis, bearing means mounting said upper steering shaft for axial rotation within said housing, manual steering means operatively connected to the free end of said upper steering shaft, releasable locking means for releasably connecting said tilt head assembly and said steering means at selected angular positions with respect to said fixed support housing, said support housing being a stamped sheet metal unit having a hollow cup-like main body mounting said first pivot means and further having a closely fitting tubular neck with respect to the upper end of said jacket assembly, said support housing having an integral stop plate inclined from said main body to limit the upward tilt movement of said tilt head assembly, fastener means connecting said support to said tubular jacket assembly.

4. The steering column defined in claim 3 wherein said tilt head assembly has a switch housing assembly secured to forming the upper end thereof, and plug-in switch means releasably secured in said switch housing.

5. The steering column of claim 3 wherein said tubular neck of said tilt head support extends into said jacket assembly and is welded thereto.

6. The steering column of claim 3 and further comprising a helical tilt spring operatively interposed between said tilt head support and said tilt head assembly for urging said tilt head assembly in a turing movement with respect to said first pivot means, a spring guide removably mounted into the wall of said cup-like main body, and said spring guide having a lower end extending downwardly from said main body to seat one end of said helical tilt spring, and means in said tilt head assembly for seating the other end of said tilt spring.

* * * * *